Aug. 23, 1927.

R. G. AVERILL 1,639,717

CAR COUPLER SYSTEM

Filed Feb. 12, 1925    3 Sheets-Sheet 3

Inventor
REX G. AVERILL

Witness:
H. J. Stromberger

By
Attorney

Patented Aug. 23, 1927.

1,639,717

UNITED STATES PATENT OFFICE.

REX G. AVERILL, OF MANSFIELD, OHIO, ASSIGNOR TO THE OHIO BRASS COMPANY, OF MANSFIELD, OHIO, A CORPORATION OF NEW JERSEY.

CAR-COUPLER SYSTEM.

Application filed February 12, 1925. Serial No. 8,679.

My invention relates to coupling systems for use in connection with cars whereby two cars may be coupled together not only mechanically, but pneumatically and electrically.

Many electrically operated cars at the present day are equipped with an automatic air brake system and also means for controlling the operation of the electric motors on two or more coupled cars from a station in either car or from either end of either car and such operation is usually referred to as multiple unit operation.

In such a system there are electric circuits leading from car to car and it is necessary to connect them at a point between the cars when the cars are brought together and to separate the circuits at this point when it is desired to separate the cars and these circuits are under the control of the train operator by means of a master controller.

It is very desirable, when coupling two cars equipped with a multiple unit system of electrical operation or in separating them, that the circuits, especially the motor control circuits or others carrying considerable current leading from car to car shall not be energized as this may interfere with the uncoupling of the cars, in that, one car is then liable to follow the other car although the mechanical coupling may be broken, and also if the cars should separate while the circuits are energized, damage to the equipment is liable to be the result and the same is true in making the coupling of two cars when the circuits are energized, and there is always the possibility of danger to employés under such circumstances.

I have, therefore, devised a system for coupling and uncoupling the electric and pneumatic circuits on two cars whereby neither of these operations can be performed while the circuits on either of the cars carrying a dangerous volume of current or pressure of air through the couplings are energized. This operation is brought about by interlocking the mechanism controlling the making and breaking of the circuits between the cars with the master controller by means of which the car operator controls the movement of the train or of the car if operated singly.

In some systems there may be a bus line connecting the two cars for feeding current from the first car to the second car for operating the motors or for equalizing the current between the cars and for other uses, and this line generally carries very heavy currents, and it is particularly desirable that this line shall be de-energized whenever couplings are made or broken between two cars and the interlocking of the coupler controlling mechanism with the master controller in a way which I shall herein describe will prevent such undesirable operation.

I have also devised a system in which I employ an electric circuit between the cars for controlling the coupling of the cars and this circuit after the operation of coupling is completed can be used for other purposes, thereby avoiding the necessity of an extra circuit through the couplers, which at times is found to be of great advantage.

There will be other objects and advantages of my system which will be herein disclosed as I further describe the same, and it will be noted that my invention resides in the new and novel construction, combination and relation of the various parts as later described, and as set forth in the drawings accompanying this specification.

In the drawings:

Fig. 1 shows the relation of the parts when the two cars have been brought together by impact thereby automatically coupling the cars mechanically and also completing the air and electric circuits at the couplers, but the electric and pneumatic circuits are not completed through the couplers from car to car as the drum switches D are open and the valves V′ and V″ are closed on both cars. The master controller M is in its off position.

When the operator is desirous of uncoupling the two cars, he closes the "off" switch in car No. 1 and again simultaneously closes the switch RS in car No. 1, and this causes the pneumatic engines E in the two cars to move from the position shown in Fig. 2 and return to the positions as shown in Fig. 1, and thereby return the switches D in the two cars to the positions shown in Fig. 1, thus de-energizing the electric circuits from car to car through the coupler and closing the valves V' and V'' controlling the pneumatic circuits. Attention is drawn to the master controller M, which is shown in the "off" position and which must be in this position before the engines E will operate.

Considering now Figs. 1 and 2, and with the master controller in the "off" position, as soon as the "on" or "off" switch is closed and simultaneously therewith the switch RS, the engines E in the two cars are immediately set into operation. Then the operator permits the switch RS to return to its normal position and the "on" switch to open, but in case the "off" switch is operated, the operator holds the RS switch closed long enough to permit separating the cars and then releases the "off" switch and the cars are ready to operate as a train or single units respectively.

The couplers and electro-pneumatic valve shown in Figs. 3 to 6 inclusive are constructions similar to those I am familiar with and are shown in U. S. Patent No. 1,223,223, issued April 17, 1917, and I have shown them herein although other forms or constructions may be used and the electric couplers may be similar to that shown in U. S. Patent No. 1,300,789, issued April 15, 1919.

Figure 3:
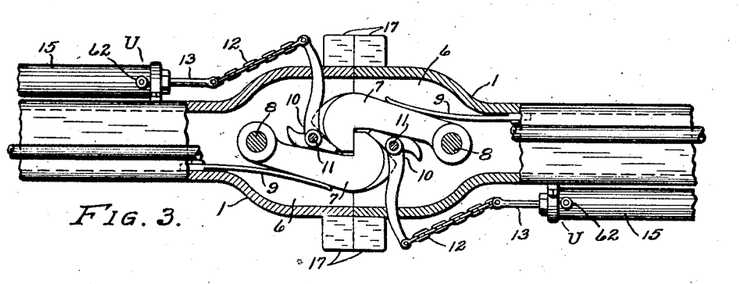
Fig. 3 is a partial view in section of the car coupler showing two heads coupled together and also showing a portion of the pneumatic uncoupling engine on each coupler head.
Figure 4:
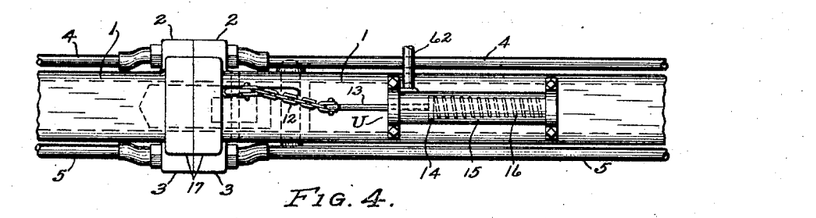
Fig. 4 is a side elevational view of Fig. 3 and shows the pneumatic conduits and the couplers for the same at the face of the car coupler.
Figure 5:
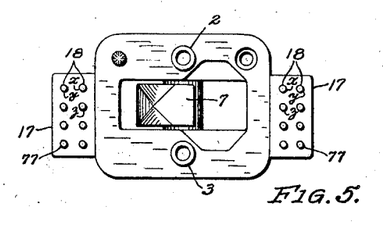
Fig. 5 is a face view of one of the coupling heads shown in Figs. 3 and 4 and shows the car coupling hood, the pneumatic couplers and the electric couplers and contacts.

In the preferred embodiment of my invention I have shown two cars, which I have designated as numbers 1 and 2, and these cars are presumed to be equipped with multiple unit control of operation and are also provided with pneumatic air brake systems which may be of the automatic type and well known at the date of my invention. Each car is also equipped with mechanical couplings 1, such as shown in Figs. 3 and 4, by means of which the cars are automatically coupled upon impact. At the face of each coupler are pneumatic couplings 2 and 3 to which lead the air lines 4 and 5 respectively, and by means of which the air circuits are completed through the coupler from car to car. The coupler heads are each provided with a recess 6 in which is mounted a coupling hook 7 and which interlock with each other and each hook is pivotally held in position by a pin 8 and maintains in a normally advanced position by means of the spring 9. Each coupler head is also provided with an unlocking cam 10 pivotally mounted upon the pin 11 and provided with a flexible link or chain 12 connected to the piston rod 13, which in turn connects to a piston 14 within the cylinder 15. The piston is held in an advanced position by means of the spring 16 and by means of which it is moved to its advanced position after having been retracted to operate the cam to move the coupling hooks to their uncoupled relation. A cam in either car will operate the hooks in both cars.

On opposite sides of the coupler heads 1 are shown the electric couplers 17 provided with butt end contacts 18. In order that the cars may be coupled end for end regardless of which ends are impacted and without danger of the circuits of one car being connected to unlike circuits on the other car, I have shown the contacts on opposite sides of the coupler head cross-connected, and do so by connecting together the contacts on opposite sides of the coupler head, which are in the same horizontal plane and equally distant from the vertical center of the coupler, that is, the two $x$ contacts (Fig. 5) are connected together, the two $y$ contacts are connected together and the two $z$ contacts are connected together, etc.

Figure 2:
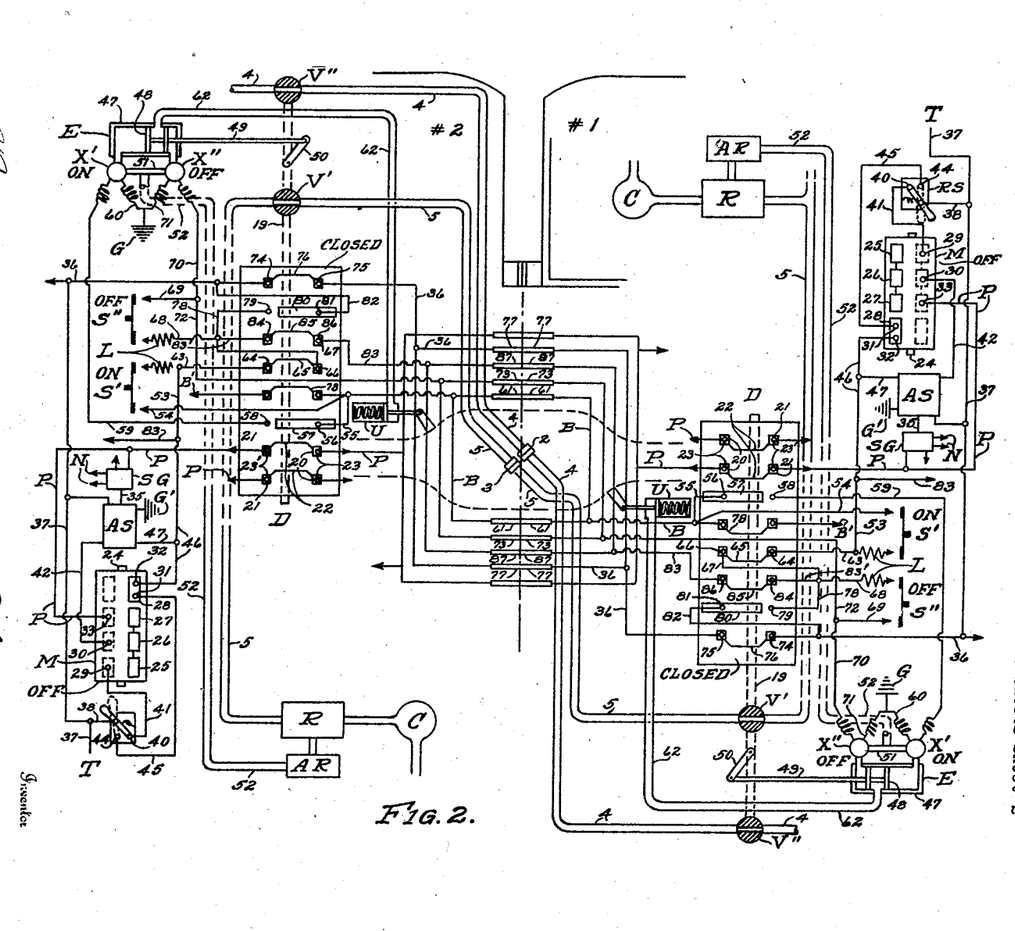
Fig. 2 is similar to Fig. 1 with the exception that the parts are shown in a fully coupled and operative relation in that, the operator has closed the "on" switch in car No. 1 and simultaneously operated the switch RS in car No. 1, after the cars had impacted, thereby causing the pneumatic engines E in the two cars to operate, which in turn operates the drum switches D to their closed position and the valves V' and V'' to their open position on the two cars thereby completing the electric and pneumatic circuits from car to car through the couplers. The master controller M is in its "off" position. The operator then released the "on" and the RS switches which returned to their normal position, as shown, due to the pull-over spring and the cars are then in fully coupled and operative relation as a unit.

Mounted upon each car, preferably at the end or ends thereof, is a rotatable drum type switch D which rotates together with a shaft 19 and is provided with contacts 20 and 21 thereon, which are shown as connected by the conductor 22. These contacts make connection with fixed contacts 23 and 23' when the drum is in what may be termed a "closed" position, which is the position taken by the drum when the cars are in coupled relation and as shown in Fig. 2.

Any number and arrangement of contacts desired to meet requirements may be used.

Figure 1:
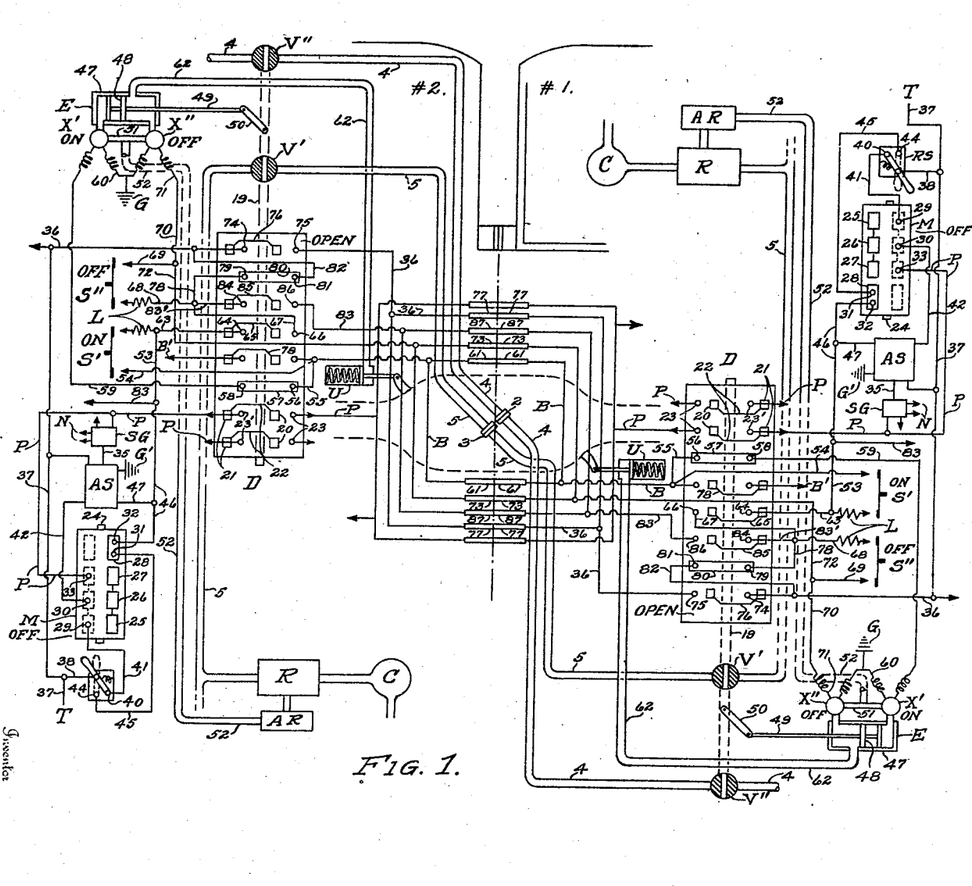
Fig. 1 is a schematic view showing the adjacent ends of two cars in coupled relation. No attempt has been made to show the specific relation or construction of the various parts and to a large degree only such parts are shown as are essential to properly disclose my invention.

In Fig. 1 the switch D is shown in the "open" position, which is the position the switch should be in when the cars are being coupled and the circuits have been uncoupled, when the cars are operating as single units or are placed in storage for any length of time. Each car is also provided with a master controller M at one or both ends and by means of which the motorman is able to control the movement of the train or car. This controller comprises a drum mounted to rotate with a shaft 24 at the will of the motorman through a handle which is detachable from the shaft 24 and constitutes a rotatable switch. The drum is also provided with contacts 25, 26, 27 and 28 and it may also have other contacts and arrangement of contacts to control any number of desired circuits. These contacts are adapted to engage with fixed contacts, as later described. In Fig. 1 the master controller switch is shown in what might be termed the "off" position and the contacts 25, 26, 27 and 28 are shown in full lines when in this position and by the dotted lines when the controller has been moved to its first "on" position, and later referred to as its "first point." The contacts 25, 26, and 27 are connected together or may be a single contact and connect the fixed contacts 29 and 30 when M is rotated from its "off" position.

The contact 27 engages the fixed contact 33 when the controller M is in the "first point" position and conductors P, P', etc., lead from the contacts 33, etc. It will be understood that the master controller M may have any number of fixed and movable contacts and conductors therefrom in addition to those shown and as may be required for the successful operation of the cars and some of which are later explained.

The conductors P, P', etc., lead to and control a group of switches indicated as SG, which automatically close to connect conductors N, N', etc., which lead to the motors, to the current suppply conductor 35.

The energization of the conductor 35 is controlled by the switch AS, which is a circuit breaker, opening automatically upon an overload on the conductor 35 and automatically closes when the controller M moves beyond its "off" position and automatically opens when the controller moves to the "off" position and which cannot be closed after opening automatically under an overload until the RS switch has first been manually operated by the car operator while the controller M is in its "off" position.

The conductors P, P', etc., also extend to contacts on the electric coupler between the cars so that when the master controller on one car is operated the switches SG on all connected cars will operate simultaneously and hence the motors on all cars will be operated and controlled simultaneously from a station in one car.

One or all cars are generally provided with a moving current collector engaging a source of power and which moving collector I indicate as T and which is connected to the bus 36 by the conductor 37. A branch conductor leads to the handle 34 of the RS switch.

The RS switch known as the "reset" switch controls a conductor 41 and normally connects the same and its contact 40 to the conductor 38 and also upon manual operation controls the conductor 45 and connects the same and its contact 44 to the conductor 38 when the handle 34 is operated.

When the controller M is in its "off" position current can flow from the trolley to the conductor 46, if the handle 34 is operated, through the elements T, 37, 38, 34, 44, 45, 31, 28 and 32, but normally the handle 34 does not engage the contact 44 and, therefore, normally the conductor 46 is de-energized and can be energized only when the controller M is in its "off" position and the motors and control circuits thereto are de-energized.

I make use of this arrangement, construction and operation of the motor controller equipment to control the operation of completing or de-energizing the electric and pneumatic circuits through the couplers from car to car. It will be noted that when the controller M is in its "first-point" or any subsequent positions, the conductor 46 can not be energized and by operating my coupler control apparatus from the conductor 46 it will be apparent that the couplings can be completed or broken only when the controller M is in its "off" position and the train line circuit P de-energized.

I make use of the air brake system for operation of engines E, which in turn operate the switch D and valves V' and V''. The air system may comprise an electrically operated compressor C, a main reservoir R, an auxiliary reservoir AR, necessary pipes and controlling apparatus and valves not shown.

The engine E for operating the switch D comprises a cylinder 47 and a double piston 48 therein connected by the rod 49 to the shaft 19 by means of the lever or other suitable mechanism 50 such that movement of the piston will rotate the switch D to either the "open" or "closed" position. Communicating with each end of the cylinder 47 is an electrically operated pneumatic valve X' or X'' shown in detail in Fig. 6, by which the air to the cylinder and the direction of movement of the piston is controlled. The air pipe 51 furnishes air to the valves and is connected to the AR reservoir by the pipe 52. Whenever the valve X' is operated electrically the air is admitted to that end of the cylinder 47 and moves the piston to the opposite end and operates the drums D to the closed position and the valves V' and V" to their open position. The drums and valves are shown in this relation in Fig. 2.

When the valve X" is operated air is admitted to that end of the cylinder 47 and the piston moved to the opposite end and moves the switch D to the open position and the valves V' and V" to their closed position, as shown in Fig. 1.

To assist in the operation of the switch D and connected valves in a single car or a train, I provide the switch D with special movable and fixed contacts whereby the circuits leading to the valves X' and X" on a single or two coupled cars are controlled and in the latter case simultaneously from one car. Other control devices are the "on" and "off" switches S' and S", respectively, which may be of any approved design and construction, and are normally open, but may be closed by the operator at will. By means of these switches the circuit to the valves X' or X" may be completed when the switch RS has been moved from normal, providing the controller M is in its "off" position. Such operation is shown in Fig. 2 in which the switch RS is shown (dotted lines) as closed on car 1 and the switch S' has been closed thereby completing the circuit to the "on" valve X' and closing the switch D.

Referring to Fig. 1 in which two cars have been coupled by impact, but in which the electric and pneumatic circuits are not completed as yet, if it is the desire of the operator to complete the coupling, he will operate the RS switch as shown in Fig. 2, and also close the "on" switch S'. Immediately current will flow from the trolley T (car 1) through the conductors 37, 38, RS, 44, 45, 31, 28, 32, 46, 53, S', 54, 55, 56, 57, 58, 59, X' (coil), 60 to G, (ground). As it is common to ground one side of the source of power, it is evident that there will be a flow of current through the "on" valve X' and operate the same providing the master controller M is in its "off" position, otherwise the circuit will be open and no current will flow to the valve X', thus making it necessary to move the controller M to its "off" position in order to complete coupling. At the same time current flows from the conductor 54 in car 1 through the conductors B, 61 (car 1), 61 (car 2), B, 55, 56, 57, 58, 59, X' (coil), 60 to G (ground), thus simultaneously operating the engine E (car 2) with that in car 1 from the operator's station in car 1.

When the electro-pneumatic valve X' is energized in either or both cars the air is permitted to flow into the cylinder 47 and move the piston to the opposite end from that to which the valve X' is connected and such operation will move the drum D to closed position and the valves V' and V" to open position and the coupling will be completed. The switch RS in Fig. 2 is shown closed (dotted lines) on car No. 1 and the drums D and valves V' and V" on the two cars are shown closed and open respectively, thus closing the electric and opening the air circuits through the couplers from car to car, and as soon as operation of the engines E has taken place the operator releases the switch S' and RS and the cars are coupled for normal train operation.

When it is desired to uncouple the cars the operator takes his position on car 1 or 2 (Fig. 2) and with the master controller M in its "off" position, he will close the "off" switch S" and the RS switch and a circuit is completed from the trolley T (in car 1) through the electro-pneumatic valves X" on both cars and the engines E on both cars will operate to move the switches D to their open position and the valves V' and V" to their closed position (see Fig. 1) immediately the engines E function.

In order to automatically uncouple the mechanical couplers from a station in either car and substantially simultaneously with the operation of the switch D to its open position, I connect a pipe 62 to the X" end of the cylinder 47 and this pipe leads to the uncoupling cylinder U and soon after air enters the cylinder 47 through the valve X" and moves the piston 48, the air then flows through pipe 62 to the uncoupling cylinder 15 and moves the piston and the links and rods 12 and 13 connected thereto and also the cam 10 and hooks 7 on the two cars and against the action of the springs 9 and 16. As noted in Fig. 2, air does not flow through pipe 62 until the piston has moved a predetermined distance and opened the switch D, thus insuring the opening of the switch D and closing of valves V' and V" before the uncoupling mechanism U has operated. The operation of both D and U are so quick, however, they may be said to be instantaneous.

Having operated the switches D, valves V' and V", and coupler hooks 7 to their uncoupled position, the operator releases the switch RS, but holds the switch S" closed until by means of the master controller M he has moved car 1 away from the car 2 with the switch D open, the valves V' and V" closed and all train line circuits P controlled by the switch D de-energized at the coupler contacts and then he releases "off" switch S".

The electric circuits for operating the engines E to the "off" position comprises T (car 1), 37, 38, RS, 44, 45, 46, 53, 63, 64, 65, 66, 67, 68, S", 69, 70, X", 71, G (ground). From the conductor 69 or 70 a branch 72 leads to the contact 73 (car 1) and then through 73 (car 2), 72, 70, X", 71 to G (car 2).

The bus line 36 connects to the fixed contacts 74 and 75 on the switch D and are connected by the movable contact connector 76 when the switch is closed. At the coupler the bus 36 connects to the contact 77.

It will be noted that the conductor 68 is connected to the bus 36 when the drum D is in its "off" position through the circuits 78, 79, 80, 81 and 82 and this is required for the reason that with the electro-pneumatic valve I have shown, and later explained, the uncoupling mechanism U is vented to atmosphere and returns to its normal coupled position as soon as the valve X" closes, which would be immediately upon the opening of the drum switch D for the reason that the supply circuit from the RS switch to the "off" switch S" is opened when the switch D opens. It is necessary to hold the uncoupling mechanism in uncoupled relation long enough to permit the operator to move the cars apart and with the bus 36 supplying current to the "off" switch S" after the switch D had opened, thus cutting off current from the RS switch, the operator may hold the switch S" closed while he operates his controller M and separates the cars.

On cars equipped with an automatic air brake system, there is usually a reservoir line 5 and a brake line 4 extending from car to car and coupled at the pneumatic couplers 3 and 2 respectively, as explained, and whenever these lines exhaust to atmosphere at the couplings 2 and 3, the brakes will automatically set and stop or prevent operation of the cars. It will be apparent that it will be impossible to operate a car or train with its end switches D closed because the valves V' and V" will be open and the brakes will set. When two or more cars are coupled, the rear end of the train has its equipment set as shown in Fig. 1 when operating normally, that is, the switch D open, and if the bus line 36 were connected to the "on" switch S' to supply current thereto when the switch D is in its open position, it would be possible for a person to intentionally operate the rear switch S', unless under lock and key, and so operate the switch D and move the valves V' and V" to their open position, thus causing an emergency application of the brakes, and to prevent this I insert a set of contacts 64, 65 and 66 on the switch D, which will open the circuit between the conductors 63 and 67, thus depriving the switch S' of current when the switch D is in its open position, but this circuit is closed however, when the drum is closed in order to supply current to the switch S" for initial operation of this switch. As soon, however, as the switch D is closed, current to the S" switch is supplied from the bus 36.

The circuits shown as 45 (car 1), 46, 53, 63, 64, 65, 66, 67, 83', 84, 85, 86, 83, 87 (car 1), 87 (car 2), 83, 86, 85, 84, 83', 67, 66, 65, 64, 63, 53, 46, 45 (car 2), ties the RS switches together on the two cars and the conductor 83" connects the conductors 46 at the two ends of the same car together so that the reset system is tied together on the train in such a manner that the operation of any RS switch will operate on the latch-switch of all AS switches.

The circuit marked B is used between the switches D on coupled cars at the connection therebetween for operating the engines E to their "on" position and after that it connects to the circuit B' through the drum contact 78 and the circuit B—B' is used for the operation of the buzzer signals or other suitable purpose desired.

Figure 6:
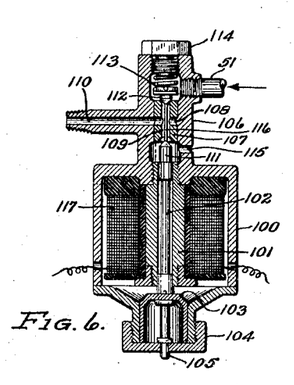
Fig. 6 is a sectional view of one form of electro-magnetic valve which I employ in connection with the engines E.

The electro-pneumatic valve shown on Fig. 6 comprises a casing 100 provided with a fixed core 101 and a reciprocating stem therein 102. At the lower end of the stem is an armature 103. The lower end of the casing is closed by a cap 104 and through this projects a stem 105, which can be operated manually to raise the armature if desired. Within the contracted portion 106 of the casing is a separately formed plug 107 having a double valve seat and forced into place and also having the passages 108 and 109, the latter communicating with the passages 108 and 110. The seats in the valve are engaged by the valve 111 secured to the stem 102 and by the valve 112 held against its seat by spring 113 and plug 114. The air pressure is in the space above the valve 112 and is lead therein by the pipe 51. The valve 111 is normally off its seat and when so, there is a passage from the engine E (Fig. 1) through the passages 110, 108, 109 and 115 to atmosphere so that the air pressure in the uncoupling mechanism U will become normal when the uncoupling or "off" switch S" is released. In order to lift the valve 112 to admit air pressure into the engine E through the passages 108 and 110 there is a projecting portion 116 to the valve 111 which engages the valve 112, when the coil 117 is energized or the pin 105 raised, and lifts the valve 112 at the same time the valve 111 closes the passage to atmosphere.

The uncoupling cam 10 may be operated by hand instead of by the pneumatic engine U if desired, in which case my system will operate equally as well on the two cars to operate the switches D to their closed or open position. If the uncoupling lever 10 is operated by hand it will require an extra man in uncoupling the cars.

In Figs. 1 and 2 the pipe lines 4 and 5 are shown twisted on car 1 in order to bring the pipes properly connected on the two cars. In the actual construction this would not be necessary for it will be noted in Fig. 5 that the couplings are on the vertical center line and, therefore, like pipe lines will be connected without any crossing of the pipes.

It is possible to operate the engines E by means of electric solenoids instead of by pneumatic pressure, but where air pressure is available upon the cars I prefer to utilize the air pressure.

It is not necessary with the system herein disclosed to have the pneumatic portion of the system on the two cars coupled together in order to operate my complete system pneumatically and electrically. The pneumatic system may be installed upon each car if so desired, with no connection therebetween or it may be installed upon one car and connected through to all the cars. There are modifications, however, of that shown in my drawings and herein described and the preferred way is to utilize the air brake system, which is usually connected through from car to car.

It will be apparent that the cars may be operated by one or more combustion engines and provided with suitable controlling means such as a switch which will control the ignition and energize the spark plugs under operation, but close a circuit from a source of battery power when the switch is "off" and which will correspond to the switch points 31 and 32 connected by the contact 28 and such circuit will go to switches similar to S' and S'' for the control of the valves X' and X'' to control the engines E. Also, the throttle control valve could have a circuit closing contact when in the "off" position which would permit the uncoupling operation when the throttle was in the "off" position.

I claim:

1. In a system of two coupled cars each provided with car, air and electric couplers and electric motors, the combination therewith of pneumatic circuits and electric circuits leading to the air and to the electric couplers and motors, means to control the opening and closing of the electric circuits, means to control the current to the electric circuits leading to the motors to operate the cars, means to operate said first controlling means to the open or closed position and means to prevent the functioning of the operating means to open said first controlling means while said motors are energized.

2. The combination with a car coupling device for motor operated cars comprising an interlocking device adapted to cooperate with a similar device on a companion car, air and electric coupling devices associated with said car coupling device and adapted to cooperate with similar air and electric coupling devices on cooperating cars, air and electric circuits leading to the air and electric couplers and a switch to control said circuits to the air and electric couplers, means to operate the switch, means to move said interlocking device on both cars to a non-interlocked position and controlled by said operating means, switches controlling electric circuits to said operating means for operating same, a controller switch for controlling current to the different electric circuits leading to the car motors and provided with means to prevent the operation of the means operating the first said switch while the controller switch is set to energize the motors.

3. The combination with controlling means for air pressure lines and electric circuits between two motor driven cars comprising a valve in each car for controlling the air lines and a switch in each car for controlling the electric circuits and means to operate the valve and switch on each car, of means for inter-connecting said controlling means on the two cars for simultaneous operation, automatic locking means operable by impact of the cars for holding said air lines and electric circuits in coupled relation, a motor control switch to energize and de-energize the car motors and circuits and contacts associated with said motor control switch and the first said control means to prevent operation of said first control means while the motors are energized.

4. In a car coupling system on a motor driven car, the combination with one or more electric train line circuits and each having an exposed electrode of an air brake system carried by the car and having a valve at the end of the car, a switch at said end, means operated automatically by impact of the car with another car for coupling said electric circuit or circuits and air brake system when the cars are moved together, means for inter-connecting said switch and valve to be operated together to energize the exposed electrode and open the valve, electrically controlled means to operate said switch and valve, a control switch to energize and de-energize the car motors and means for electrically connecting said electrically controlled means and said control switch to prevent closing the first switch and opening the valve while the motors are energized.

5. The combination with an electric coupler and a plurality of train line circuits connected thereto, of a switch for controlling said circuits, a fluid pressure train pipe, a valve device for controlling comunication through the train pipe, pneumatic means for operating the switch and valve device to their open or closed position, manually operated means controlling the functioning of the operating means, a manually operated switch controlling the current through said train line circuits and preventing the control means from functioning to open or close the first said switch and valve device while current is flowing in said train line circuits.

6. In a car coupling system, the combination of a car coupler provided with holding means to cooperate with a companion coupler, means to move the holding means to its non-cooperating position with respect to its companion coupler, a manually operated motor control switch operable to a plurality of positions and means inter-connected with the switch and with the moving means and with a source of power to prevent operation of the moving means and with it the holding means to its non-cooperating position when the switch is positioned to energize the motor.

7. In a car coupling system, the combination of a car coupler provided with holding means to cooperate with a coupler on a companion car, pneumatic means to move the holding means to a non-cooperating position with respect to the companion car coupler, electrically controlled means to control the operation of the pneumatic means, a motor control switch operable to "off" and "on" positions and manually operated means electrically inter-connected with the switch and electrically controlled means to control the operation of the electrically controlled means and to permit moving the holding means to its non-cooperating position when the switch is in its "off" position only.

8. In a car coupling system, the combination of a car coupler provided with holding means to cooperate with a companion coupler, means to move the holding means to a non-cooperating position with respect to its companion coupler, an electro-pneumatic valve to control air pressure to the moving means to operate the holding means and means inter-connected with a train line control switch to prevent operation of the electro-pneumatic valve when the train line circuits are energized.

9. In a car coupling system, the combination with a plurality of train line circuits having exposed electrodes, of a fluid pressure brake system carried by the car, a switch to control said circuits to said electrodes, a fluid pressure operated means to operate said switch to its open or closed position, electrically operated means to control said fluid pressure operated means, manually operated switches to control the operation of the electrically operated means, energizing circuits leading from a source of power to said electrically operated means and controlled by said manually operated switches and a manually operated switch to control the train line circuits and the energizing circuits to render said energizing circuits inoperative when the train line circuits are energized.

10. In a system of two coupled cars each provided with car and electric couplers, the combination therewith of electric circuits leading to the electric couplers, a switch having a plurality of positions to control the energizing and deenergizing of the circuits, an automatic uncoupling mechanism for the car couplers, means to operate the uncoupling mechanism, the last said means being inter-connected with the said switch to prevent the functioning of the controlling means when the circuits are energized by the switch.

11. In a system of two coupled cars each provided with car and electric couplers, the combination therewith of electric circuits leading to the electric couplers, automatic uncoupling mechanism for the car couplers, means including an electric circuit to control the operation of the uncoupling mechanism and a switch to control the electric circuits to open the circuit to the control means when the circuits to the electric coupler are closed.

12. In a system of two coupled cars each provided with car, air and electric couplers, the combination therewith of electric circuits leading to the electric couplers, air circuits leading to the air couplers, automatic uncoupling mechanism, a switch to control the electric circuits and pneumatically operated means controlled by the said switch to permit the operation of the pneumatically operated means only when the electric circuits are de-energized.

13. In a system of two similarly equipped and coupled cars each provided with car, air and electric couplers and motors, the combination therewith of electric circuits connected to the electric couplers to operate the car motors, air circuits connected to the air couplers, automatic car uncoupling mechanism for the car couplers, an automatic switch to control the energizing of the electric circuits to the coupler, a hand switch to control the energizing of the circuits to the first switch, air valves to control the air circuits and operable with the first switch to close the air circuits when the electric circuits are open and vice versa, operating means for the uncoupling mechanism, air operated means to operate the switch and valve and control the operating means for the uncoupling mechanism, electro-pneumatic valves controlling the operation of the air operated means for the automatic switch and the valves and the uncoupling mechanism, circuits for supplying current to and for connecting the electro-pneumatic valves on the two cars and passing through the electric couplers and controlled by the automatic switch for the operation from either car of the electro-pneumatic valves on both cars and means on the hand switch cooperating with one of the said circuits to render the said circuits and switches inoperative when the hand switch is set for energizing the first said circuits.

14. In a system of train pipe coupling devices on a plurality of cooperating cars comprising a plurality of fluid pressure connections and car and electric coupling devices between cooperating cars, the combination therewith of controlling valves in each of the cars interposed in each of the fluid pressure connections, fluid pressure operated devices for operating said controlling valves in the fluid pressure connections in both cars from a station in one car, electrically operated means for controlling the operation of the said devices and means controlling the operation of the electrically operated means comprising a manually operated switch for controlling the energization of the car motors when in one position and preventing the operation of the electrically operated means when in the same position, a manually operated switch to be closed when desired to open the valves and circuits to the electrically operated means controlled by the manually operated means and the manually operated switch.

15. In a car uncoupling system, the combination of an automatic car uncoupling mechanism, motors to operate the car, means to control the operation of the motors and means to prevent the operation of the automatic uncoupling mechanism while current is flowing to the motors.

16. In a car uncoupling system on two cooperating cars, the combination of an automatic car uncoupling mechanism on each car, means to operate the uncoupling mechanism from a station remote from the uncoupling mechanism, an electric coupler on each car provided with contacts, a bus line circuit in each car connected to its respective electric coupler contact and coupled together by said electric couplers to supply current to the motors, a switch controlling each bus line to open or close the same from car to car, a manually operated switch under control of the operator to control the current from the bus line to the motors, a circuit from a source of power to the operating means for the uncoupling mechanism to operate the same and means connected with the manually operated switch to control the circuit to prevent the operation of the uncoupling mechanism while the switches are opening the bus line from car to car.

17. In the coupling and uncoupling of two cars provided with car couplers, electric couplers, bus line circuits from car to car and coupled by the electric couplers and switches to control the bus circuits, the combination therewith of means to automatically uncouple the cars and means to prevent the operation of the automatic means to prevent uncoupling the cars while the bus line circuits are complete from car to car.

18. The combination with a train of two or more coupled cars provided with car, air and electric couplers, motors to operate the cars and means in each car under control of an operator to control the uncoupling of said car, air and electric couplers and means to control the energizing and de-energizing of the car motors, of means to prevent the uncoupling of the car, air and electric couplers by said operator from any car while the motors are energized.

In testimony whereof I affix my signature.

REX G. AVERILL.